E. A. HAWTHORNE.
BATTERY AND SWITCH CASING.
APPLICATION FILED AUG. 9, 1913.

1,174,571.

Patented Mar. 7, 1916.
2 SHEETS—SHEET 2.

Witnesses:
Horace A. Crossman
Carl L. Choate

Inventor:
Ellsworth A. Hawthorne
by Emery Booth Janney & Varney
Attys.

UNITED STATES PATENT OFFICE.

ELLSWORTH A. HAWTHORNE, OF BRIDGEPORT, CONNECTICUT.

BATTERY AND SWITCH CASING.

1,174,571.

Specification of Letters Patent.   Patented Mar. 7, 1916.

Application filed August 9, 1913.   Serial No. 783,858.

*To all whom it may concern:*

Be it known that I, ELLSWORTH A. HAWTHORNE, a citizen of the United States, and a resident of Bridgeport, county of Fairfield, and State of Connecticut, have invented an Improvement in Battery and Switch Casings, of which the following description, in connection with the accompanying drawings, is a specification, like characters on the drawings representing like parts.

This invention relates to battery and switch casings, and more especially to a combined battery, switch, and casing constituting a housing therefor, the apparatus forming a unitary structure for the supply of current to the lamps, horn, or other electrical devices of a vehicle, such for example as a motor cycle, and the device is intended to afford protection for the internal parts from external influences, such as dust and water, as well as from tampering by unauthorized persons.

My invention will be best understood by reference to the following specification, when taken in connection with the accompanying drawings of one illustrative embodiment thereof, while its scope will be more particularly pointed out in the appended claims.

Figure 1:
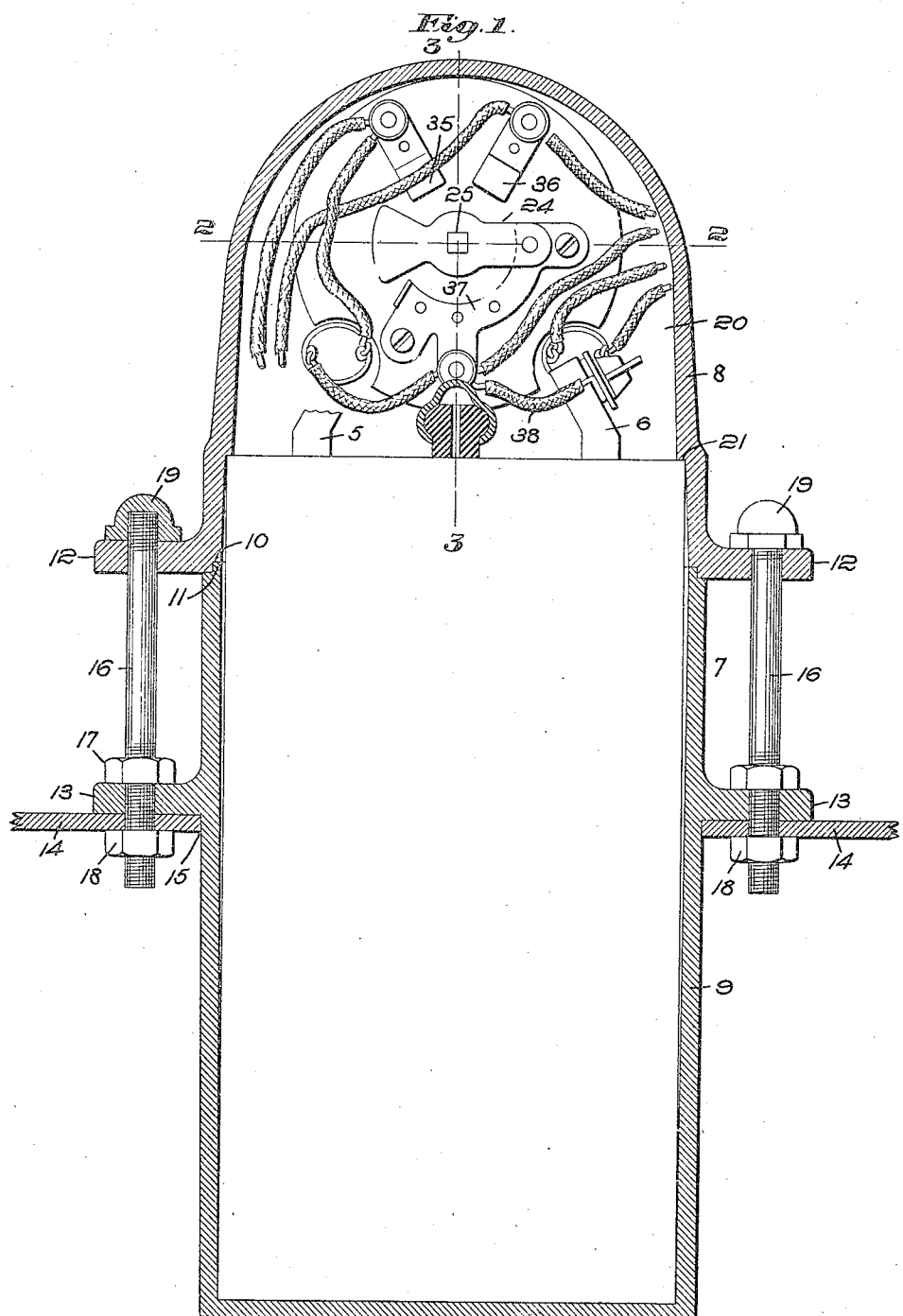
Figure 2:
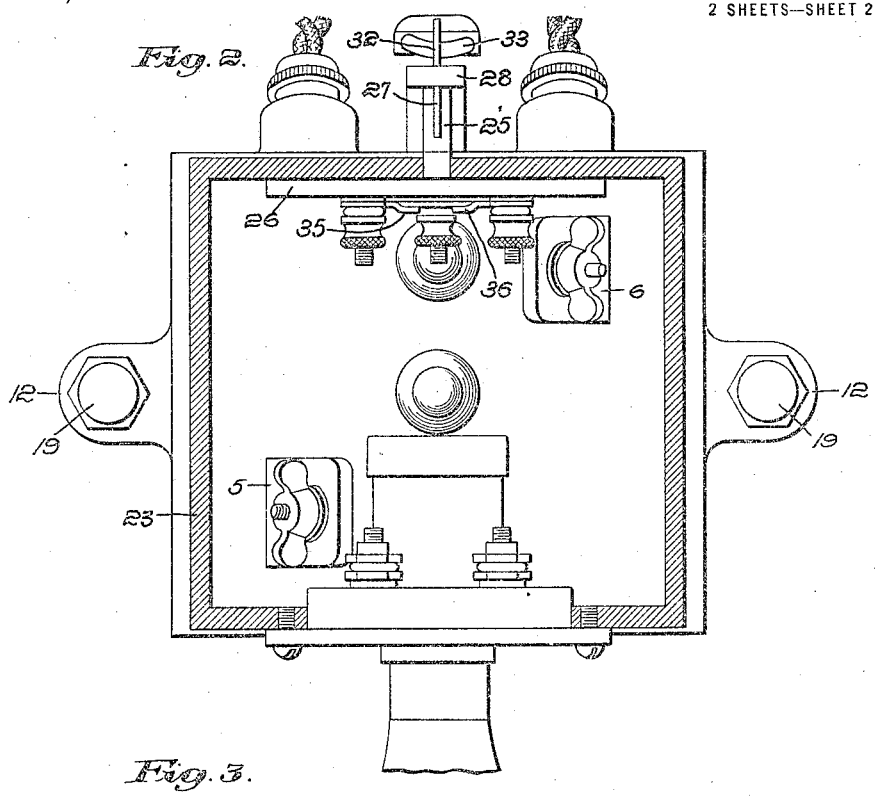
Figure 3:
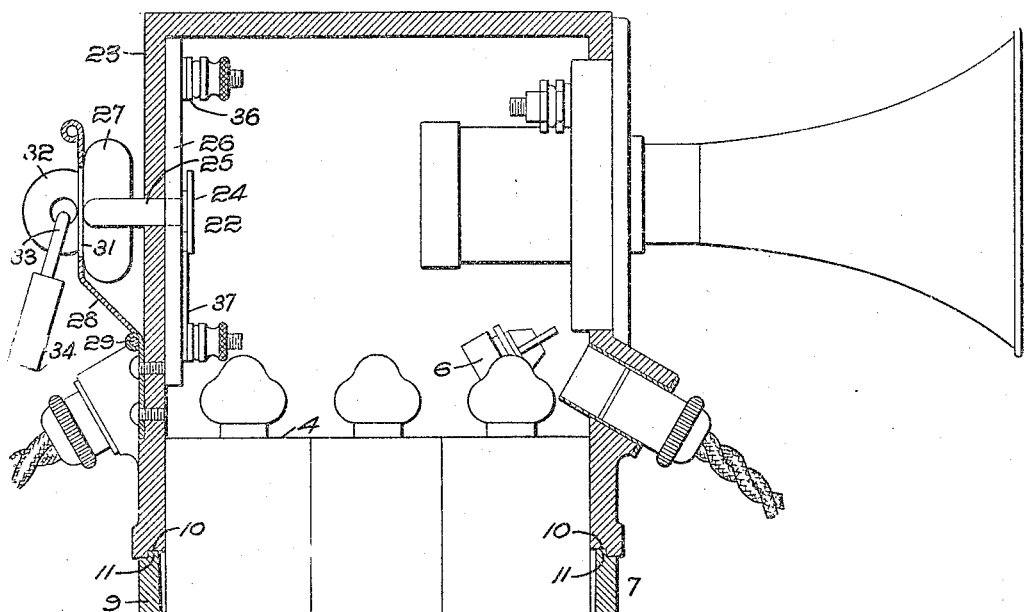

In the drawings: Figure 1 is a vertical sectional view of a portion of a battery, switch mechanism, and casing therefor, embodying my invention; Fig. 2 is a plan section of the same on line 2—2 of Fig. 1; and Fig. 3 is a vertical section partly in elevation on line 3—3 of Fig. 1.

Referring to the drawings, and to the embodiment of my invention which I have selected for illustration, I have there shown an electrical apparatus, which may have other uses, but is particularly intended to be used in connection with a motor cycle, and when so used is intended to be appropriately mounted upon the steering structure forward of the handle bar, directly in front of the rider, at which point the control of the apparatus is centralized.

In the illustrative embodiment shown, 4 is a battery which may be of any other appropriate type, but as herein shown is a familiar form of storage battery having terminals 5 and 6. The battery is herein mounted in a casing designated generally by the numeral 7, comprising upper and lower sections 8 and 9, respectively, which preferably abut between the top and bottom of the battery, with their abutting surfaces preferably interengaging with each other to exclude dirt and moisture, the upper section being herein provided for this purpose with a groove, or recess 10, which receives a flange or tongue 11 on the lower section.

The upper section 8 is herein provided with laterally projecting lugs 12—12, and the lower section is provided with similar lugs 13—13, the latter resting upon a support herein in the form of a plate 14 having an aperture 15 to receive the body of the section 9. To this support, the lugs 13—13 are secured by bolts 16—16, extending through the lugs 13, as well as the support 14, and provided with nuts 17—17 above the lugs, and nuts 18—18 below the support.

As a means for securing the upper and lower sections of the casing to each other, the bolts 16 are extended upwardly through the lugs 12, and are provided above the latter with nuts 19—19, which serve to draw the two parts of the casing toward each other, and insure a tight fit between their abutting surfaces. By simply removing the nuts 19, the upper section of the casing may be removed, to afford access to its interior, without disturbing the attachment of the lower section to this support. The upper section is herein provided with a chamber 20 above the battery, and as a means for preventing the latter from rising in its casing, owing to road shocks, the upper section is provided with an inwardly projecting shoulder 21, engaging the upper edge of the battery and effectually holding the same immovable.

The chamber 20 provides a housing for a switch mechanism designated generally by the numeral 22, for the control of the circuit or circuits leading from the battery. This switch mechanism, which may be of any appropriate character, is mounted in fixed position on the inner face of a fixed wall 23, bounding one side of the chamber 20, the latter being wholly closed and accessible only by the removal of the upper section of the casing from the lower. By this means, the entire switch mechanism and its connections with the battery are protected from the entrance of dust and moisture, as well as being protected from tampering by unauthorized persons.

The switch 22 may be of any other suitable character, but herein comprises a switch plate 24 secured to a shaft 25 extending through an insulating plate 26, and through the fixed wall 23 to the exterior of the casing, where it is provided with a suitable handle, preferably in the form of a key 27. In order to prevent unauthorized persons from tampering with the switch, I have herein provided a hasp 28 hinged at 29 to the casing below the switch, and provided with a slot 31 which receives the switch key 27. The latter is herein provided with an eye 32, to receive the pivoted bolt 33 of a padlock 34. When the rider wishes to operate the switch, he simply removes the padlock, and swings the hasp on its hinge rearwardly and downwardly out of its engagement with the switch key, so that the latter may be grasped and inturned. Though the switch is thus unlocked to permit its operation, however, the switch mechanism itself and its wiring are protected from tampering by mischievous persons, and can be reached only by dismounting the entire apparatus. The switch is herein provided with two stationary contacts 35 and 36, and a contact plate 37, the latter being connected by a wire 38 to the terminal 6 of the battery, while the contacts 35 and 36 may be connected by appropriate wiring to the lamps or other devices which the switch is intended to control. The specific construction of the switch and its connection with the lamps or other devices form no part of my present invention, but form the subject matter of a separate application, and it will be unnecessary to further describe the same herein, except to say that the switch is intended to be turned about its axis from one position to another to complete the circuit or circuits from the battery to the light or lights of the apparatus.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described one embodiment of my invention, what I claim and desire by Letters Patent to procure is:

1. In an apparatus of the class described, the combination, of a casing comprising upper and lower sections having abutting portions and provided with pairs of laterally extending lugs, a support on which one set of said lugs is mounted, bolts securing the last-mentioned lugs to said support and extending through the other lugs, and nuts having threaded engagement with said bolts to secure said sections together.

2. In an apparatus of the class described, the combination, of a casing comprising upper and lower sections having abutting portions and provided with pairs of laterally extending lugs, a support on which one set of said lugs is mounted, bolts extending through the last-mentioned lugs and said support as well as through the other lugs, nuts threaded onto said bolts beneath said support and above the lugs supported thereon, and nuts threaded onto said bolts to draw the casing sections toward each other.

In testimony whereof, I have signed my name to this specification, in the presence of two subscribing witnesses.

ELLSWORTH A. HAWTHORNE.

Witnesses:
E. STEWART HAWTHORNE,
E. HORACE HAWTHORNE.